US007507456B2

(12) United States Patent
Sing

(10) Patent No.: US 7,507,456 B2
(45) Date of Patent: *Mar. 24, 2009

(54) LAMINATED STRUCTURAL MEMBERS

(75) Inventor: Peter Sing, P.O. Box 1691, McCleary, WA (US) 98557

(73) Assignee: Peter Sing, McCleary, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/357,305

(22) Filed: Feb. 17, 2006

(65) Prior Publication Data

US 2006/0141201 A1   Jun. 29, 2006

Related U.S. Application Data

(60) Continuation-in-part of application No. 11/058,052, filed on Feb. 15, 2005, now Pat. No. 7,147,741, and a division of application No. 10/046,182, filed on Jan. 14, 2002, now Pat. No. 6,890,398.

(51) Int. Cl.
*B32B 1/06* (2006.01)
*E04B 2/70* (2006.01)

(52) U.S. Cl. .............................. 428/55; 428/71; 428/72; 428/119; 52/309.9

(58) Field of Classification Search ................... 428/54, 428/55, 60, 71, 72, 119; 52/309.9, 309.11, 52/309.14, 737.4, 730.7, 793.11, 233
See application file for complete search history.

(56) References Cited

U.S. PATENT DOCUMENTS

| 3,773,604 A | * | 11/1973 | Desai et al. | ............. 220/560.05 |
| 4,503,648 A | * | 3/1985 | Mahaffey | ................... 52/223.7 |
| 5,115,609 A | * | 5/1992 | Sing | ........................... 52/309.9 |
| 5,976,670 A | * | 11/1999 | Fugazzi | ....................... 428/161 |
| 7,147,741 B2 | * | 12/2006 | Sing | ........................... 156/264 |

* cited by examiner

*Primary Examiner*—Alexander Thomas

(57) ABSTRACT

Cell walls (16) made of wood form a plurality of cells in which a filler material 18 (e.g. foam insulation) is received. Facing members (12, 14) are glued to the sides of the core structure (10). The grain of the wood cell walls (16) extend sideways of the core (10), such that in grain is directed towards the facing members (12, 14). This construction may be used to form logs (L) used for making log cabins, beams, columns, etc. It may also be used for constructing panels used to form furniture elements, such as desks, cabinets, etc., and for making doors.

10 Claims, 7 Drawing Sheets

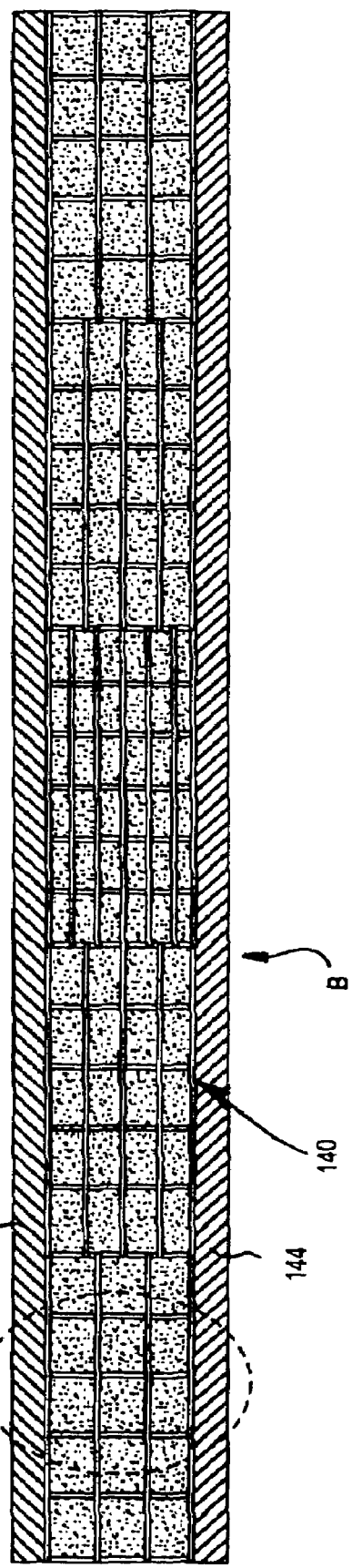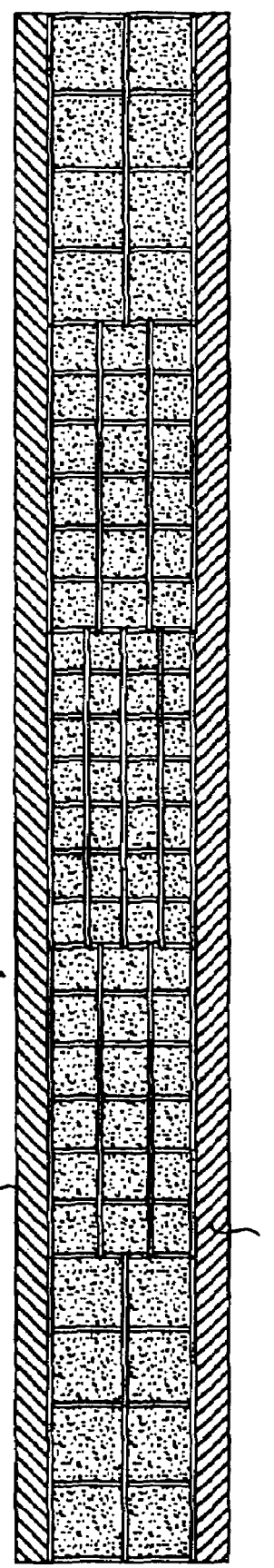

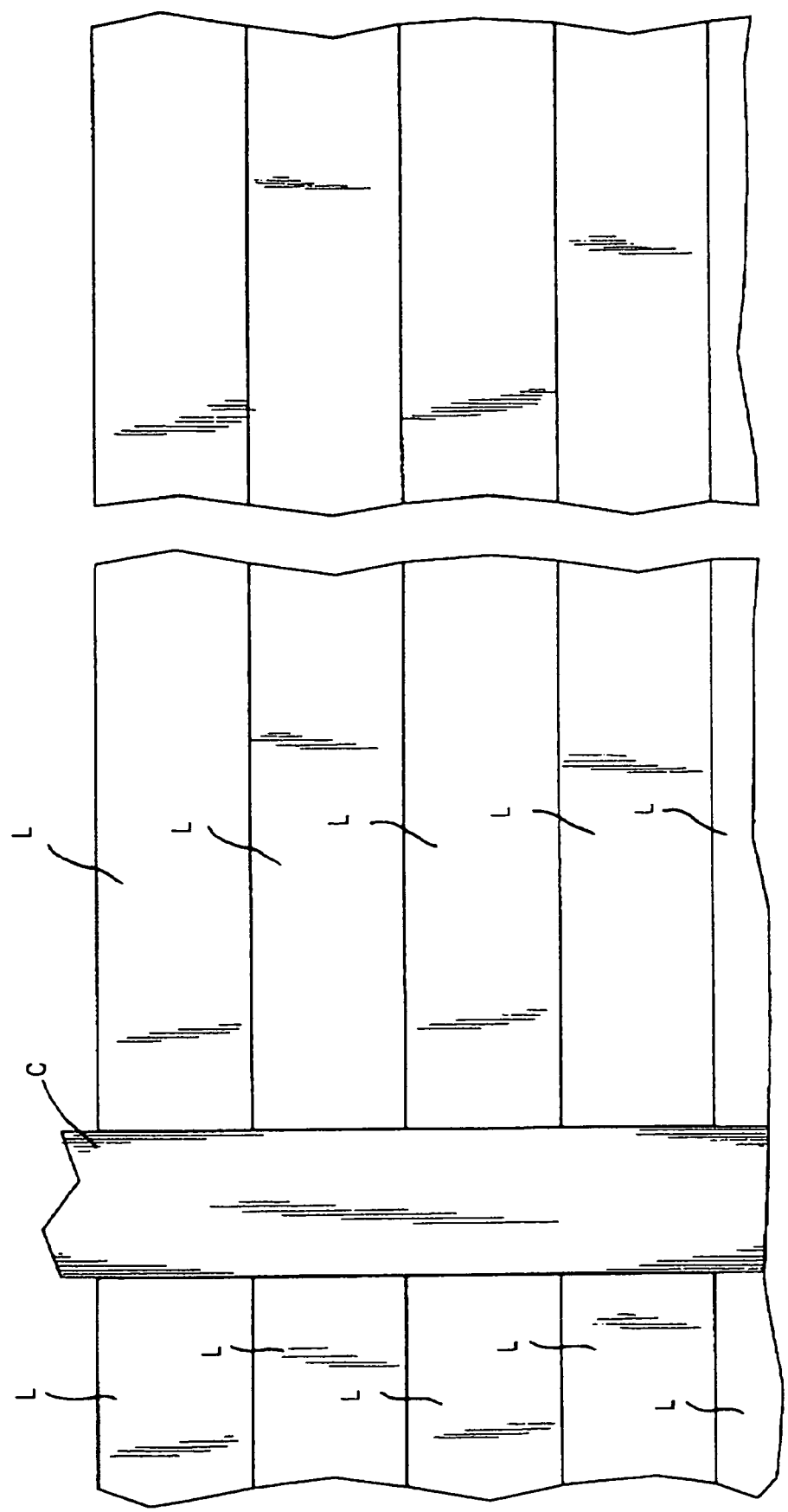

LAMINATED STRUCTURAL MEMBERS

RELATED APPLICATION

This application is a continuation-in-part of my application Ser. No. 11/058,052, entitled Method of Making Structural Panels, filed Feb. 15, 2005 now U.S. Pat. No. 7,147,741, as a division of my then application Ser. No. 10/046,182, filed Jan. 14, 2002, entitled Method of Making Structural Cellular Cores Suitable to Use of Wood, and now U.S. Pat. No. 6,890,398, granted May 10, 2005.

TECHNICAL FIELD

This invention relates to structural members such as panels, beams, logs, and posts, usable for making houses and similar structures and for making cabinets, desks and similar structures. More particularly, it relates to building members made from relatively high density materials, such as wood, and low density material, such as foam plastic, laminated to form a structure that is both relatively strong and light weight. The invention also relates to methods of making the structural members.

BACKGROUND OF THE INVENTION

This invention both utilizes and improves on technology that is disclosed in my U.S. Pat. No. 5,115,609, granted May 26, 1992, and entitled Method of Converting Logs And Resultant Product, and in the aforementioned U.S. Pat. No. 6,890,398 and the aforementioned co-pending application Ser. No. 11/058,052.

U.S. Pat. No. 5,115,609 discloses utilizing log segments and low density material, such as foam plastic, to make load-bearing timbers to be used for walls, beams, joists and the like. U.S. Pat. No. 6,890,398 and pending application Ser. No. 11/058,052 discloses making cellular cores and attaching side panels or facing members to the cores to make structural members. The present invention relates to laminated structural members having cellular cores and facing members in which the cell walls are made from wood, the grain of which is orientated to best enable the structural members to carry loads that would crush the low density filler material, such as foam plastic, if used alone to form the core.

Accordingly, a primary objective of the present invention is to provide a method which enables economically acceptable manufacture of cellular cores having cell walls made of wood, and to structural member formed of the cellular cores and one or more facing members. It is a further object of the invention to utilize the cellular cores to better make structural members that are connected together by tongue and groove or mortise and tenon joints.

BRIEF SUMMARY OF THE INVENTION

The present invention includes providing a structural member that comprises a cellular core having first and second opposite sides in which the cell walls are formed by strips of wood having a grain that extends substantially perpendicular to the first and second sides of the core. A facing member is connected to one or both sides of the core. A low density material is placed in the cells of the core and is bonded to the wood strips that form the cell walls and to the facing member or members that are bonded to the core.

Another aspect of the invention is to bond a facing member to both sides of the core and at one end of the structural member extend the end of the core beyond the ends of the facing members, so as to form a tenon at that end. At the opposite end of the structural member, the facing members extend endwise beyond the core to form a complementary mortise at that end of the structural member.

In another embodiment of the invention, the facing member or members includes at least one side cavity directed towards the core. Insulation material may be introduced into the cavity or cavities.

According to yet another aspect of the invention, the structural member is elongated and along one edge the core projects outwardly beyond facing members to form a tongue on the structural member. At the opposite edge of the structural member, the facing members extend outwardly from the core to form a complementary mortise in that edge of the structural member.

It is a further object of the invention to form an elongated structural member having a foam-filled cellular core, and two relatively thick facing members on opposite sides of the core. The facing members and core are laminated together and then longitudinal grooves are formed in two of the edges of the facing members and complementary tongues are formed on the other two edges of the facing members. Preferably, the cell walls are made of wood having a grain that extends perpendicular to the facing material. The cell walls may be thin strips of a single wood ply. Or, they may be strips of thin plywood such as the type used as facings for doors.

Yet another aspect of the invention is to provide an elongated beam or column structure having a foam-filled cellular core and facing members, in which the size of the cells and the number of cell walls are varied throughout the length of the structural member to better handle the loads imposed on the structure that want to make it deflect or buckle.

These and other advantages, objects and features will become apparent from the following description of a best mode of the invention, and other embodiments, from the accompanying drawings and from the claims which are all incorporated herein as part of the disclosure of the invention.

BRIEF DESCRIPTION OF THE SEVERAL VIEWS OF THE DRAWINGS

Like reference numerals are used to designate like parts throughout the several views of the drawing, and:

FIG. 6 is a sectional view of an elongated structural member having a foam-filled cellular core and solid wood facing members, such view showing the cells decreasing in size and increasing in member, inwardly from the ends of the core to the center of the core;

FIG. 7 is a view like FIG. 6, but showing another way of varying the core construction so as to increase resistance to bending or buckling inwardly of the ends of the structural member to the center of the structural member;

FIG. 8 is a fragmentary side elevational view of a segment of a wall comprising horizontal logs and vertical posts.

DETAILED DESCRIPTION OF THE ILLUSTRATED EMBODIMENT

The contents of U.S. Pat. Nos. 5,115,609 and 6,890,398, and the contents of co-pending application Ser. No. 11/058,052, are hereby incorporated herein by this specific reference.

Figure 1:
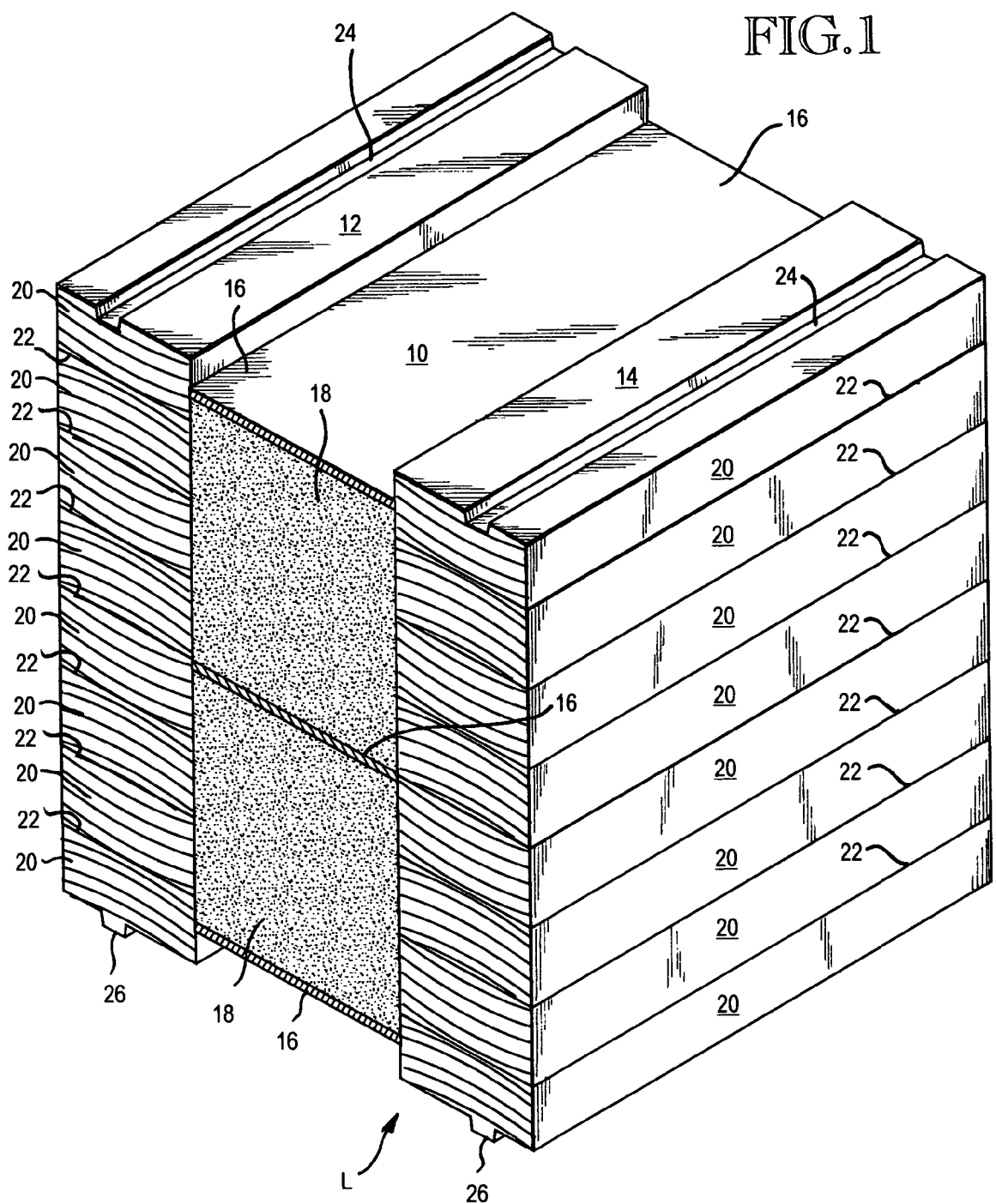
FIG. 1 is a fragmentary pictorial view of a section of a log, beam or post, showing a cellular core positioned between two facing members, said cores including a low density material in the cells and showing grooves formed in the upper edges of the facing members and tongues formed on the lower edges of the facing members, so that the structural member can be joined by use of the tongue and groove to adjacent members of the like construction.

Referring to FIG. 1, a foam-filled core 10 is shown sandwiched between two facing members 12, 14. Core 10 is a foam-filled cellular core in which the cells are formed by thin wood cell walls 16, some of which extend parallel to the facing members 12, 14 and the others of which extend perpendicular to the facing members 12, 14. The cells between the cell walls 16 are filled with a low density material 18 which may be a foam plastic insulation material. The core 10 may be constructed in the manner described in my U.S. Pat. No. 6,890,398 and in my U.S. pending patent application Ser. No. 11/058,052. The core 10 may be constructed like the core shown by FIG. 2 of U.S. Pat. No. 6,809,398 and FIG. 2 of U.S. application Ser. No. 11/058,052.

The structural members shown by FIG. 1 may be a horizontal log for building a structure the way that a log cabin is built. The facing members 12, 14 may be constructed from smaller members 20 that are laminated together at glue lines 22. The opposite side faces of the core 10 are glued to the inside surfaces of the facing members 12, 14. After the core 10 and the two facing members 12, 14 are glued together, the log L is run through a machine that provides the log L with a four-square cut and forms longitudinal grooves 24 in the upper edges of the facing members 12, 14 and forms downwardly projecting tongues 26 on the lower edges of the facing members 12, 14. The tongues 26 are sized to fit within the grooves 24 of another log L below the log L that illustrated. The tongues 26 on a third log L that is above the illustrated log L fit down in the grooves 24 formed in the upper edges of the illustrated log L.

As described in my U.S. Pat. No. 6,890,398, and in my application Ser. No. 11/058,052, filler sheet plies of low density material are bonded to thin wood sheet plies to form filler/wood sheets. A stack of these filler/wood sheets is formed so as to position the wood sheet plies between the filler sheet plies. The adjacent filler/wood sheets are bonded together by a suitable adhesive. After the adhesive has cured, the stack is sliced parallel to the grain of the wood sheet plies to form sheets composed of wood strips or webs having strips of filler material between them. These sheets of wood ribs and filler strips are stacked together with more thin wood sheet plies. A wood sheet ply is placed on the top of the stack. Another is placed on the bottom of the stack. A wood sheet ply is placed between each adjacent rib member. The wood sheet plies are orientated so that the grain of the wood extends parallel to the grain of the wood in the wood ribs or strips. This stack of wood sheet plies and rib members are glued together by a suitable adhesive. The adhesive is allowed to cure. Then the stack is cut perpendicular to the ribs, viz. perpendicular to the grain of the wood, so as to create a plurality of cellular core members. Each core member 10 is composed of wood ribs and filler material between the ribs. The grain of the wood extends crosswise of the wood ribs and the core has first and second opposite sides.

Another way of making the core 10 is to make an open celled core in the manner disclosed in U.S. Pat. No. 6,890,398 and in application Ser. No. 11/058,052 and then introduce a suitable low density filler material in the open cells. For example, a foam plastic can be foamed in place in the cells. The foam plastic filler material will not only fill the cell spaces but will bond itself to the ribs that form the walls of the cell.

Regardless of how the core 10 is constructed, the wood strips that form the ribs or cell walls are orientated so that their grain extends cross wise of the core, viz. extends from one side of the core to the opposite side of the core. As a result, the core 10 is better able to resist forces imposed on the structural member that want to move the facing members 12, 14 together and against the sides of the core 10.

In preferred form, the facing members 20 are cut so that their grain extends in the manner shown in FIG. 1. This puts edge grain on the exposed outer surfaces of the facing members 12, 14.

Figure 2:
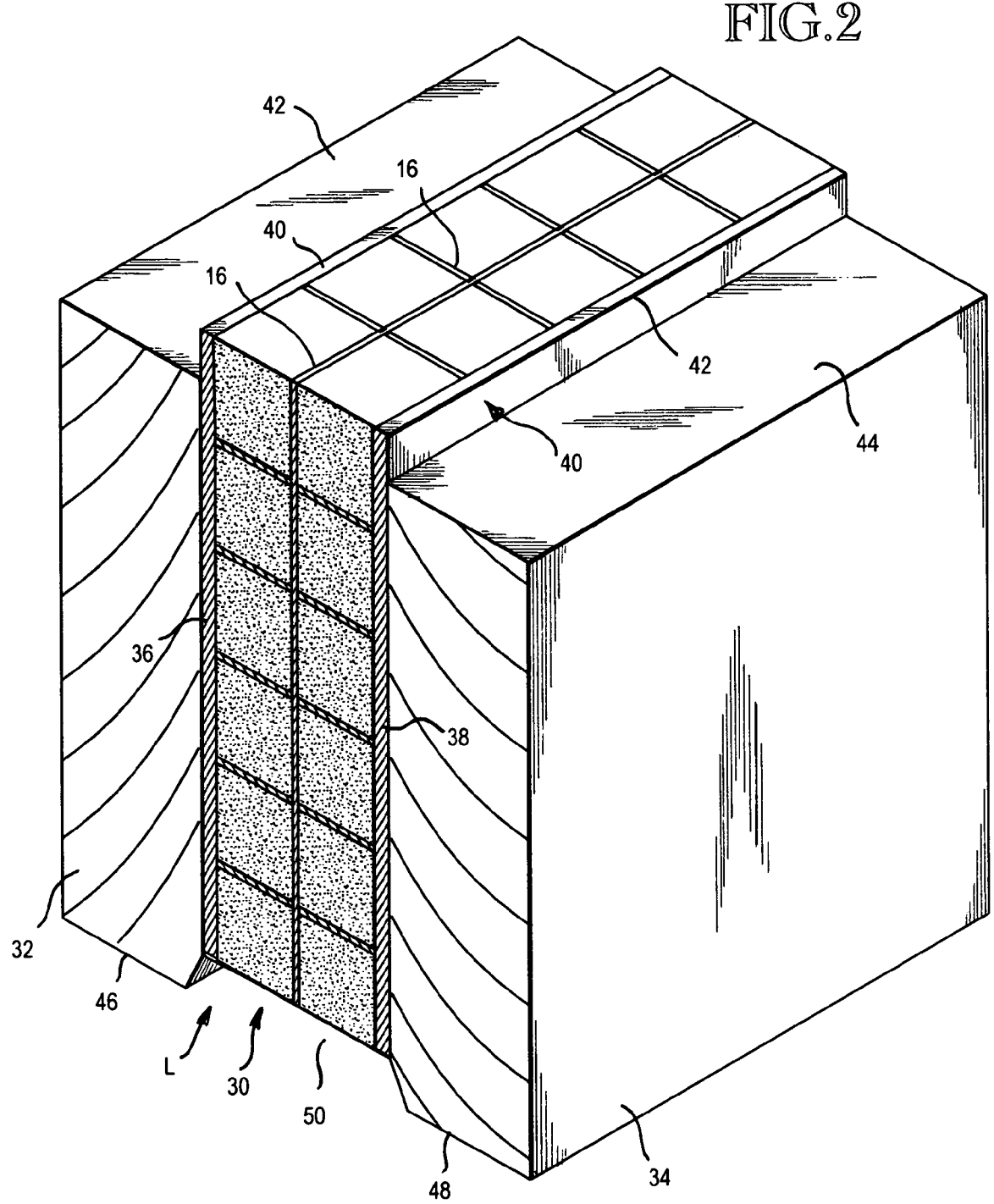
FIG. 2 is a view like FIG. 1, but showing a different construction of the core, a different construction of the facing members, and showing the core shifted in position between the facing members to form a tongue on one edge of the member and a groove in the opposite edge of the member.

FIG. 2 shows a laminated structural composed of a core 30 and two facing members 32, 34. FIG. 2 shows the end member of a log L or beam that extends horizontally in use. Accordingly, it is appropriate to call the core 30 and the facing members 32, 34 "planks." They are planks that are bonded together at glue lines 36, 38. In this embodiment, the foam filled cell structure is provided with a sheet of ply 40, 42 on its sides, will extend the full height and length of the core 30. The ply 40, 42 may be a thin wood sheet. Or, it may be a sheet of some other structural material. The sheets 40, 42 are bonded to the cellular core 30 and then the facing members 32, 34 are bonded to the sheet material 40, 42. In this embodiment, the core 30, including the sheets 40, 42 is shifted upwardly so that a tongue 40 is formed that projects above the edge surfaces 42, 44 of the facing members 32, 34. Along the lower edge of the structural member, the edge of the core 30 is inset from the lower edge surfaces 46, 48 of the facing members 32, 34. This forms a groove 50 in the lower edge that is sized to receive the tongue 40 of another log L that is positioned below the log L that is illustrated. In like fashion, the tongue 40 extending along the top edge of the log L fits into the groove 50 formed in another log L that is set down on the log L that is illustrated.

In the same manner that the core 30 is shifted in position relative to the facing sheets 32, 34, for forming the tongue 40 and the groove 50, the core 30 may be shifted in position endwise to form a mortise in one end of the structural member and a tenon on the opposite end.

In the embodiment of FIG. 2, the core 30 is shown to have additional core walls 16 creating more cells in which the filler material 18 is received. The use of an increase number of cell walls makes the core 30 stronger.

Figure 3:
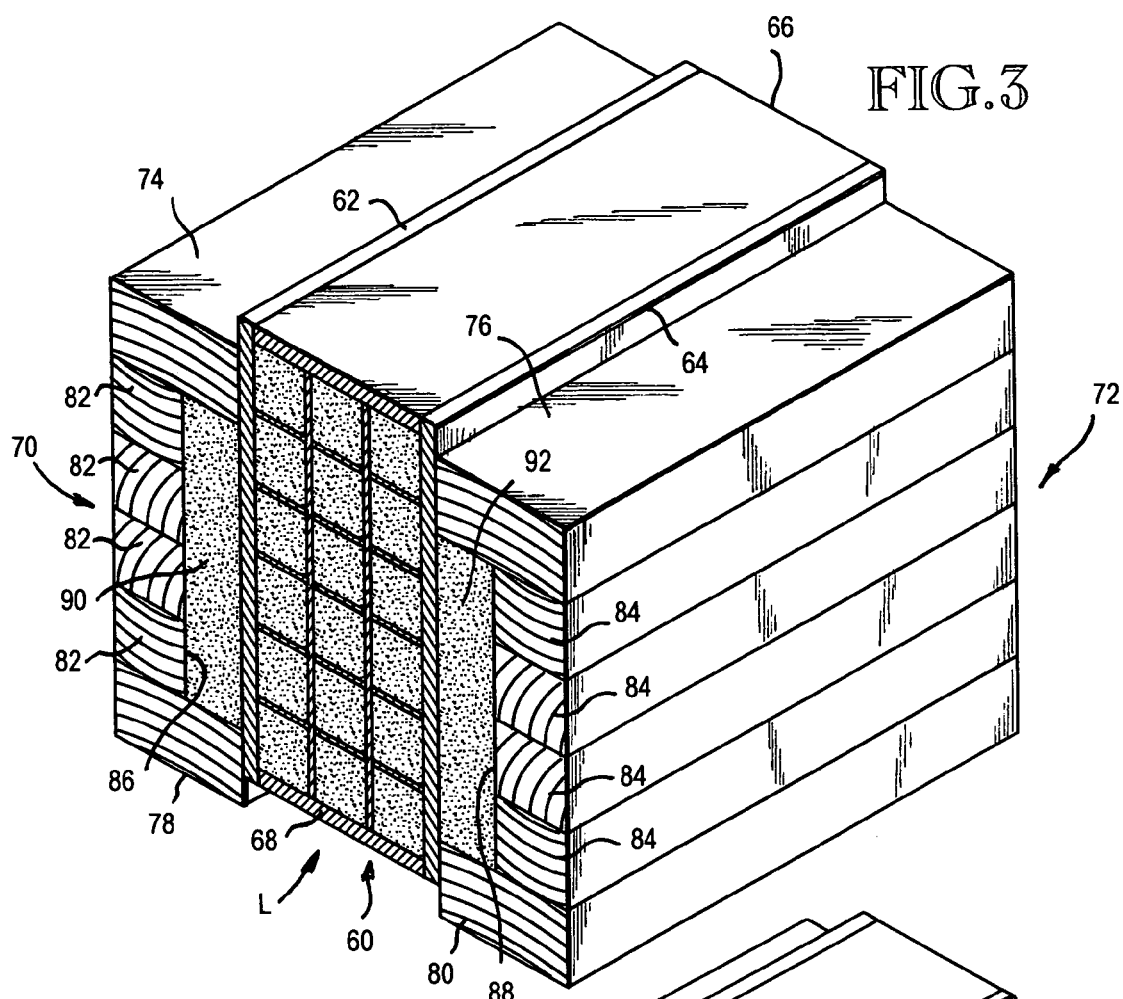
FIG. 3 is a view like FIGS. 1 and 2, but of another embodiment of the structural member, showing additional changes in the core and in the facing members.

FIG. 3 shows another way of constructing the structural member or log L. In this embodiment, the core 60 is three cells wide and six cells deep. Also, the core 60 is covered on its sides by sheet plies 62, 64 and at its top and bottom by sheet plies 66, 68. The facing members 70, 72 are formed of wood strips laminated together in the manner illustrated. The upper and lower strips 74, 76 and 78, 80 are wider than the intermediate strips 82, 84. This forms cavities 86, 88 in the inner sides of the members 70, 72. Preferably, a filler material 90, 92 is placed in the cavities 86, 88. The filler material 90, 92 may either be planks of filler material that are glued in the cavities. Or, a suitable filler material may be formed in situ in the cavities 86, 88.

Figure 4:
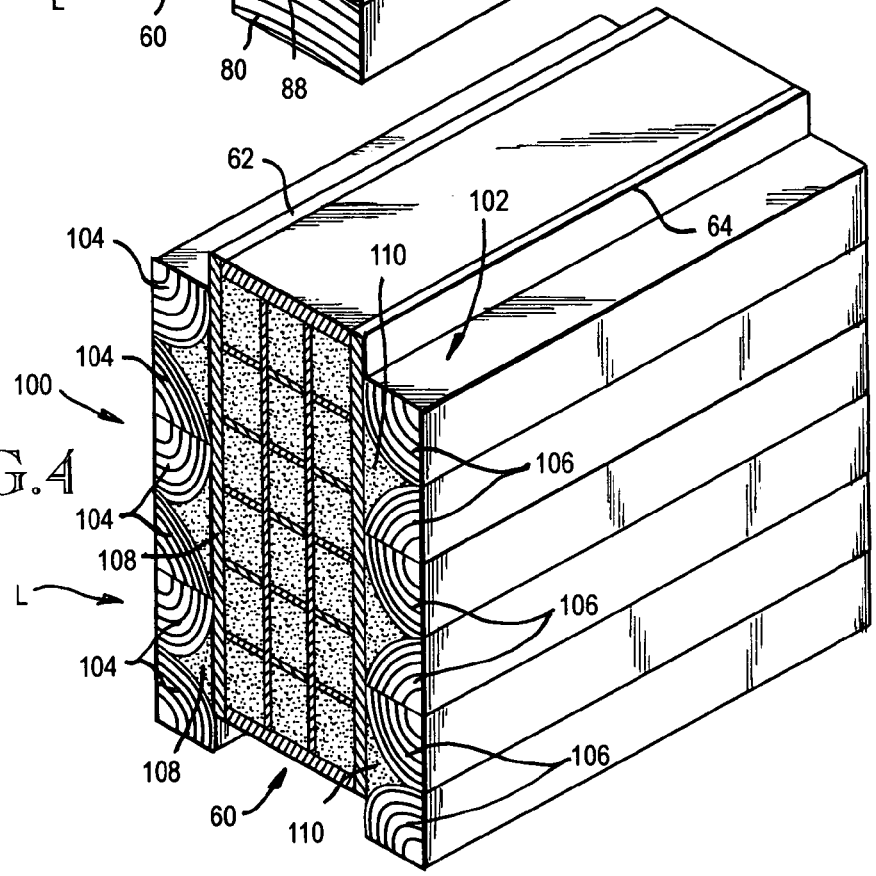
FIG. 4 is a view like FIGS. 1-3, showing the use of quarter-log segments joined together to make up the facing members, and showing use of foam material in the cavities formed on the inside of such members, between the facing members and the core.

FIG. 4 shows a further modified construction of the log L. It has a core like core 60 and facing members 100, 102 that are constructed in the manner shown in U.S. Pat. No. 5,115,609. In this embodiment, the cavities are formed between the quarter son members 104, 106, between their inner curved surfaces and the ply sheets 62, 64. The filler material 108, 110 is placed in these cavities.

Figure 5:
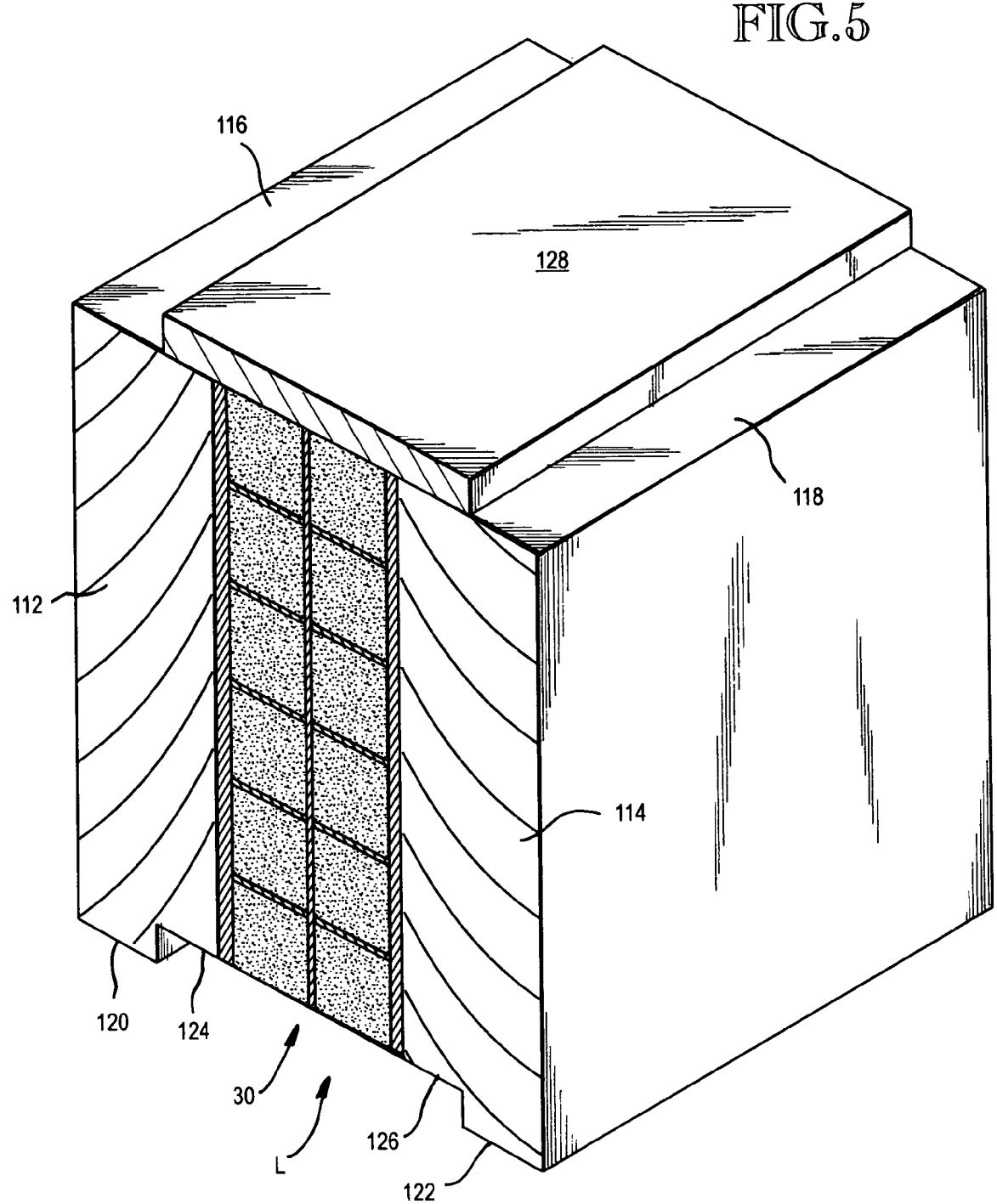
FIG. 5 is a view like FIGS. 1-4, showing another embodiment of the invention which is similar to the embodiment of FIG. 2 but includes a different construction of the tongue and groove or mortise and tenon.

The embodiment shown by FIG. 5 may have a core 30 like the core 30 in the embodiment shown by FIG. 2. In the FIG. 5 embodiment, the facing members 112, 114 are shown in the form of planks having upper edges 116, 118 that are substantially flesh with the upper edge of the core 30. The facing members 116, 118 have lips 120, 122 formed on their lower edges. Laterally inwardly of the lips 120, 122, the lower edges have surfaces 124, 126 that are substantially co-planar with the lower edge of the core 30. A plank 128 is glued to the upper edges of the core 30 and the facing members 116, 118 in the manner shown in FIG. 5. The plank 128 is sized to fit into the groove or recess formed in the bottom of the log L, between the lips 120, 122. In this manner, a tongue is formed by the plank 128 at the upper edge of the log L, a mortise is formed in the bottom edge of the log L, below the bottom of core 30 and surfaces 124, 126 and laterally between the lips 120, 122.

FIG. 6 shows an elongated beam structure B having a cellular core 140 sandwiched between facing sheets 142, 144. In this embodiment, the cell density increases from the ends of the beam B to the center of the beam B. By way of example, the core 140 has opposite end portions made up of a first cell size. Inwardly of the end portions the core comprises regions where the cell size is smaller. Beam B includes a center region in which the cell sizes are smaller yet. The smaller cell sizes are a result of the use of a greater number of cell walls. The cell walls can carry greater loads transversely of the beam B than can the filler material in the cells. The construction shown by FIG. 6 is suitable for beam B that is subject to a greater amount of deflection at its center than at its ends. The same structure could be used for forming a column in which end loads on the column will make the column want to buckle.

FIG. 7 is a modified beam B (or column) in which the cells are connected in yet another way.

Figure 9:
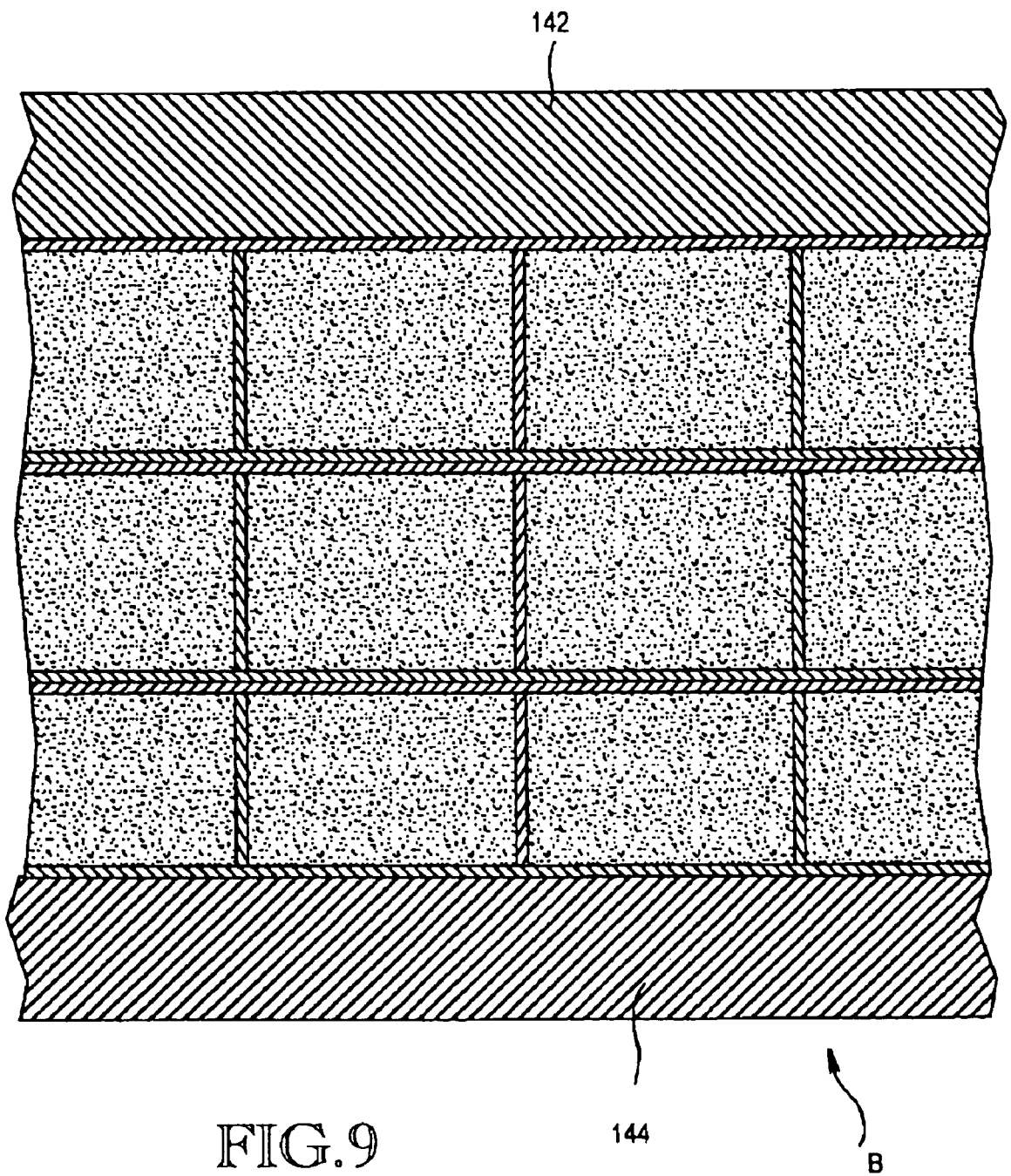
FIG. 9 is a fragmentary sectional view showing the actual construction of the core shown by FIGS. 6 and 7.

FIG. 9 shows the actual construction of the cells in the structures shown by FIGS. 6 and 7. The cross member of wood all contact wood sheet at their ends.

The embodiments that have been illustrated and described are logs L, beams B, and columns, each of which is an elongated member having two sides and two edges (or four sides). However, the filled cell core construction can be used for a wide variety of structures, including doors, desk tops, and cabinet sides, tops and shelves.

FIG. 8 shows a segment of a wall, and shows that the wall is formed from logs L and columns C. The logs L and columns C may be constructed in any one of the ways that are described above. The ends of the logs L that join with the column C can be formed with mortise and tenon components which engage the tongue and groove components of the column C.

The illustrated embodiments are only examples of the present invention, and, therefore, are non-limitive. It is to be understood that many changes in the particular structure, materials and features of the invention may be made without departing from the spirit and scope of the invention. Therefore, it is my intention that my patent rights not be limited by the particular embodiments that are illustrated and described herein, but rather are to be determined by the following claims, interpreted according to accepted doctrines of patent claim interpretation, including use of the doctrine of equivalents and reversal of parts.

What is claimed is:

1. An elongated, composite log, comprising:
   a pair of elongated, laterally spaced apart facing members constructed at least in part from wood, said facing members having confronting inside surfaces which define an elongated core space between them, said facing members also having opposite outside surfaces, a top and a bottom;
   an elongated core in the core space, said core comprising a plurality of wood strips connected together to form cell walls, with a first set of the wood strips extending horizontally and being perpendicular to the inside faces of the spaced apart facing members, and with a second set of the wood strips extending vertically and being perpendicular to both the inside surfaces of the facing members and the first set of wood strips, said first and second sets of wood strips together forming six-sided cells extending in parallel rows both vertically and horizontally and lengthwise of the logs;
   a low density material in the cells of the core, said low density material being bonded to the wood strips that form the cell walls;
   wherein the horizontal and vertical strips of wood in the core extend crosswise of the core between the facing members and have a grain that extends crosswise of the log, for transmitting loads between the first and second facing members;
   wherein one of the top and bottom of the log includes a longitudinally extending tongue; and
   wherein the other of the top and bottom of the log includes a complementary longitudinally extending groove;
   wherein each log may be stacked with the tongue of the logs fitting in the groove of another log.

2. The log of claim 1, wherein said elongated first facing member comprises a stack of wood members which are connected together and to the core.

3. The log of claim 2, wherein said elongated second facing member comprises a stack of wood members which are connected together and to the core.

4. The log of claim 1, wherein the core has a first sheet on its first side and a second sheet on its second side, wherein the first facing member is bonded to the first sheet, and the second facing member is bonded to the second sheet.

5. The log of claim 1, wherein the combined widths of the first and second facing members is greater than the width of the core.

6. The log of claim 1, wherein the first facing member includes a side cavity directed towards the core, and this side cavity contains a low density material.

7. The log according to claim 6, wherein the second facing member includes a side cavity directed towards the core and this side cavity contains a low density material.

8. The log of claim 1, wherein the first and second facing members have first edge surfaces that are substantially co-planar and second edge surfaces that are substantially co-planar, and wherein the core has an elongated edge portion that projects outwardly beyond the first edge surfaces of the first and second facing members, to form a tongue component of the tongue and groove joint, and an opposite longitudinal edge portion which is indented inwardly from the second edge surfaces of the first and second facing members, to form a groove component of a tongue and groove joint.

9. The log of claim 1, wherein the strips of wood that forms the plurality of cells includes a third set of strips of wood that extend vertically substantially parallel to the first and second sides of the core.

10. The log of claim 1, wherein the first facing member includes a first edge and a second edge, and said second facing member includes a first edge and a second edge, wherein the first edge of the first facing member is substantially co-planar with the first edge of the second facing member, wherein the second edge of the first facing member is substantially co-planar with the second edge of the second facing member; and wherein the log has an elongated groove extending along one of the top and bottom, said groove being bounded on its sides by outer portions of the second edge portions of the first and second facing members, and wherein the log includes an elongated tongue of a complementary size and shape to said groove extending along the other of the top and bottom.

* * * * *